(12) United States Patent
Wang

(10) Patent No.: US 6,213,154 B1
(45) Date of Patent: Apr. 10, 2001

(54) VOLUME ADJUSTABLE FAUCET

(76) Inventor: Kuo-Hsin Wang, 9F3R, No. 210, Chung Hsueh Rd., Tainan (TW)

( * ) Notice: Subject to any disclaimer, the term of this patent is extended or adjusted under 35 U.S.C. 154(b) by 0 days.

(21) Appl. No.: 09/557,935

(22) Filed: Apr. 21, 2000

(51) Int. Cl.[7] ................................................ F16L 55/00
(52) U.S. Cl. .............................................. 138/45; 251/121
(58) Field of Search ........................... 137/613; 251/121, 251/120; 138/45, 46

(56) References Cited

U.S. PATENT DOCUMENTS

| 955,531 | * | 4/1910 | Mueller | 251/121 X |
| 2,204,106 | * | 6/1940 | Reedy | 251/121 X |
| 4,311,170 | * | 1/1982 | Dolan | 251/121 X |

* cited by examiner

Primary Examiner—Kevin Lee

(57) ABSTRACT

A volume adjusting faucet includes a body with an outlet, a switch and an adjust valve, and a rod portion. The rod portion has a through hole at a proper location and vertical to a passageway for containing the adjust valve, which has a valve body and a valve cap both provided with an annular groove for a O-shaped ring to fit therein. The valve body has a small neck portion with a vertical hole. Then the valve body is inserted in the through hole from one side, and the valve cap is inserted in the through hole from the other side to screw with the valve body together. If the adjust valve is rotated by the switch, the angle between the through hole and the passageway is altered to alter the volume of water flowing out. Further, the small neck portion enables water to flow with the minimum volume even if the through hole and the passageway form 90 degrees, achieving the function of water saving.

7 Claims, 7 Drawing Sheets

VOLUME ADJUSTABLE FAUCET

BACKGROUND OF THE INVENTION

This invention relates to a volume adjustable faucet, particularly to one having an adjust valve not falling off a faucet even in case of large water pressure. The faucet includes a body with an outlet, a switch and an adjust valve, and a rod portion. The characteristic is the rod portion having a through hole at a proper location and vertical to a passageway for containing the adjust valve therein. The adjust valve has a valve body and a valve cap both provided with an annular groove for a O-shaped ring to fit therein to prevent leak. The valve body has a small neck portion with a through hole. Then the valve body is inserted in the through hole from one side, and the valve cap is inserted in the through hole from the other side to screw with the valve body together. If the adjust valve is rotated and the angle between the through hole and the passageway is adjusted, the volume of water flowing out is altered. Further, the small neck portion enables water to flow with the minimum volume even if the through hole and the passageway form 90 degrees, achieving the function of water saving.

A known conventional faucet shown in FIGS. 1 and 2 includes a body with an outlet A and a net A1 fixed in the outlet A to divide water with net holes and crossing net ribs to reduce water flowing out of the outlet. But if a faucet has a net but not an adjust valve, flowing volume is very large when the faucet is opened with a valve A3 totally opened. So this kind of faucet does not have water saving function. In addition, an outlet with a net may be clogged with small matters after a long period of use, necessary to clean the net.

Another conventional faucet disclosed in the publication No. 287602 in Taiwan includes a valve stopper in a valve base and inserted in the valve base from under upward. Though it has a function of adjusting volume, it has a drawback that an O-shaped ring is used to combine the valve stopper and the valve base, contacting the wall of the valve base. So when the O-shaped ring reduces in its elasticity, the stopper may explode off the faucet owing to water pressure, causing water leak or hurting persons around if worse.

SUMMARY OF THE INVENTION

The objective of the invention is to offer a volume adjustable faucet of a new style, durable, not subject to wear of the O-shaped ring, adjustable in the volume of water flowing out.

One feature of the invention is the body of the faucet has a rod portion with a through hole located vertical to a water passageway.

Another feature of the invention is an adjust valve including a valve body and a valve cap, and the adjust valve is positioned in the through hole to alter the volume of water to flow out of the faucet, keeping the minimum volume of water flowing out.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
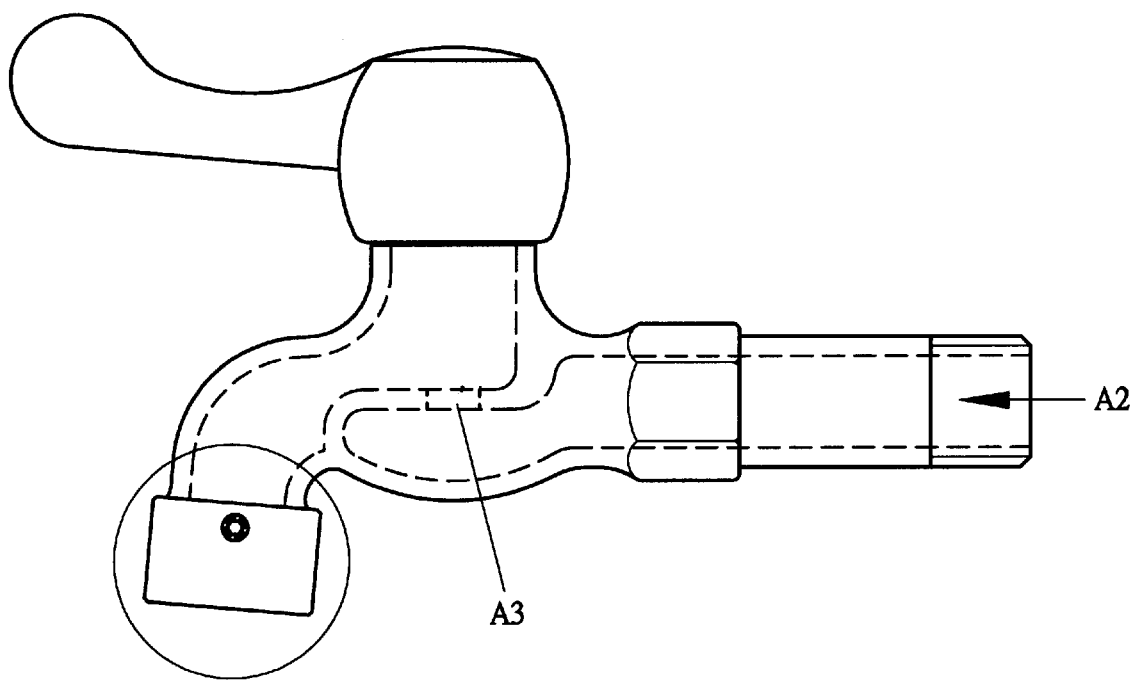
FIG. 1 is a side view of a known conventional faucet.
Figure 2:
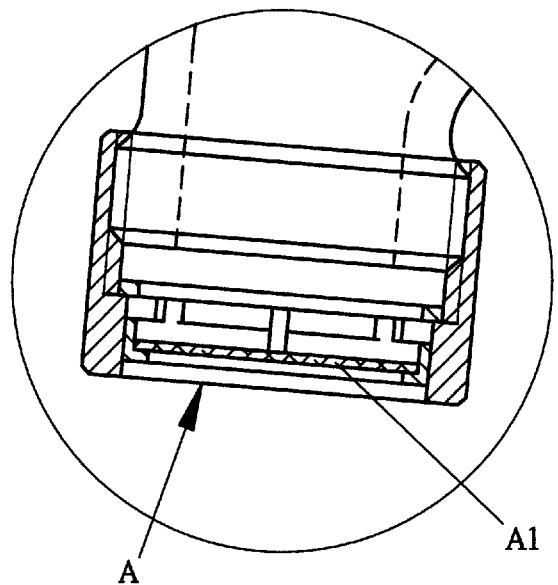
FIG. 2 is a cross-sectional view of an outlet of the known conventional faucet.
Figure 3:
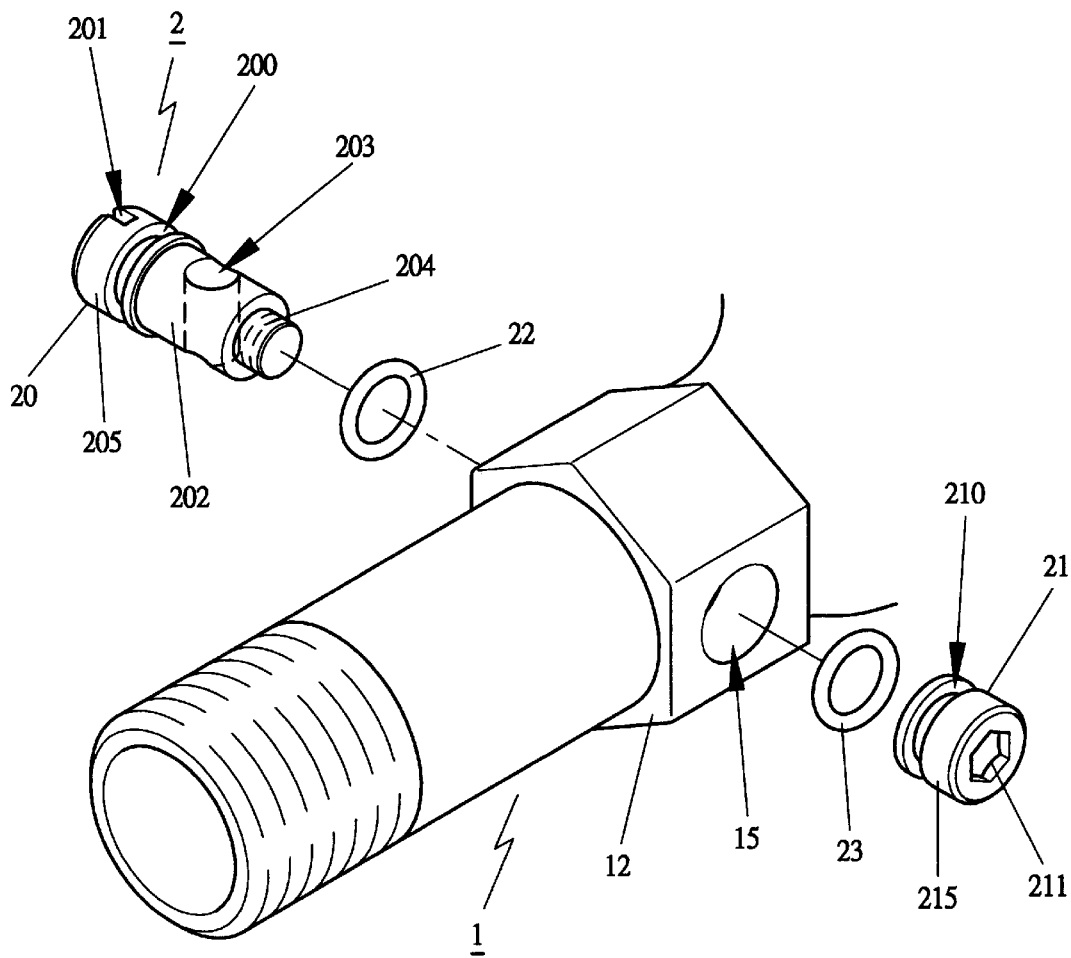
FIG. 3 is an exploded perspective view of a volume adjustable faucet in the present invention.
Figure 4:
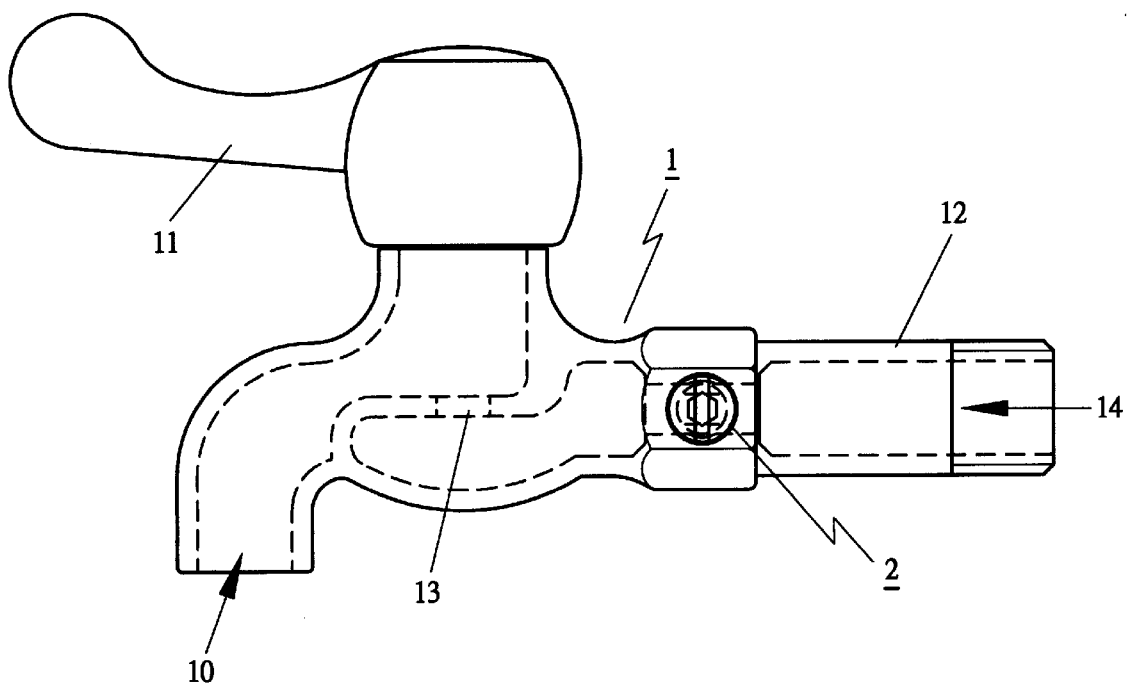
FIG. 4 is a side view of a first embodiment of a volume adjustable faucet in the present invention.

A first embodiment of a volume adjustable faucet in the present invention, as shown in FIGS. 3 and 4, includes a body 1 with an outlet 10, a switch 11 and a rod portion 12, a valve 13 contained in the body 1 and controlled by the switch 11 to open in various degrees (as this art is well-known, not shown in Figures). A water passageway 14 is formed in the rod portion 12 to the outlet . A through hole 15 is formed in the rod portion in a vertical condition to the water passageway 14.

Figures 6, 7:
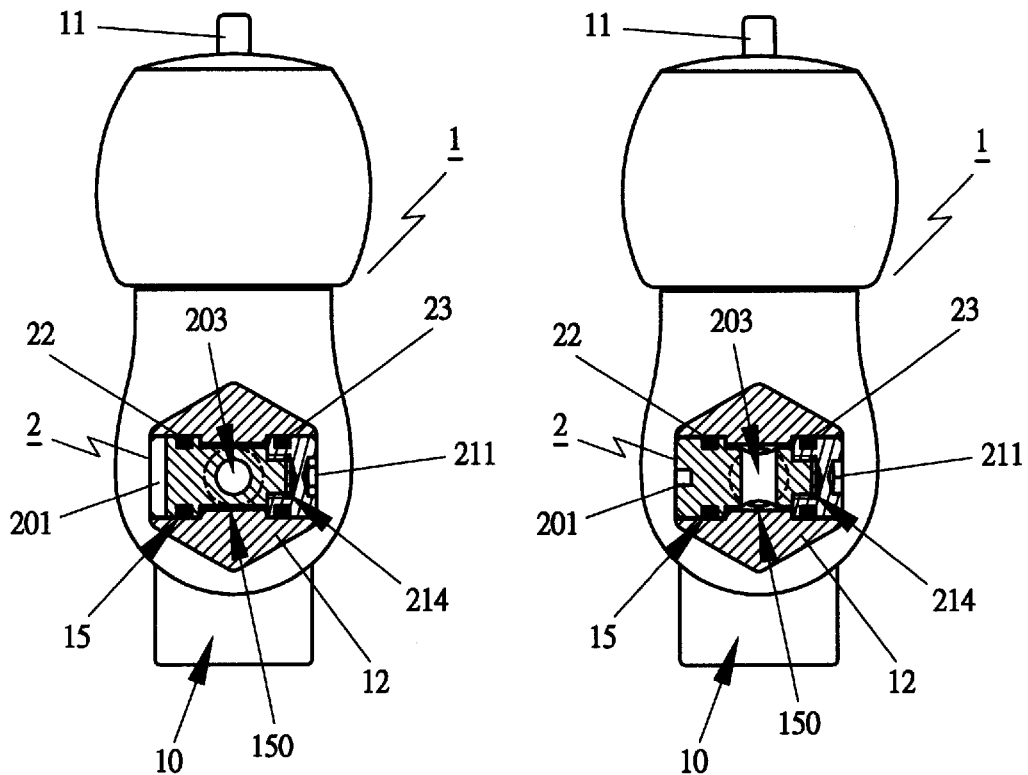
FIG. 6 is a cross-sectional view of the first embodiment of a volume adjustable faucet with the largest volume of water flowing out in the present invention.
FIG. 7 is a cross-sectional view of the first embodiment of a volume adjustable faucet with the least volume of water flowing out in the present invention.
Figure 8:
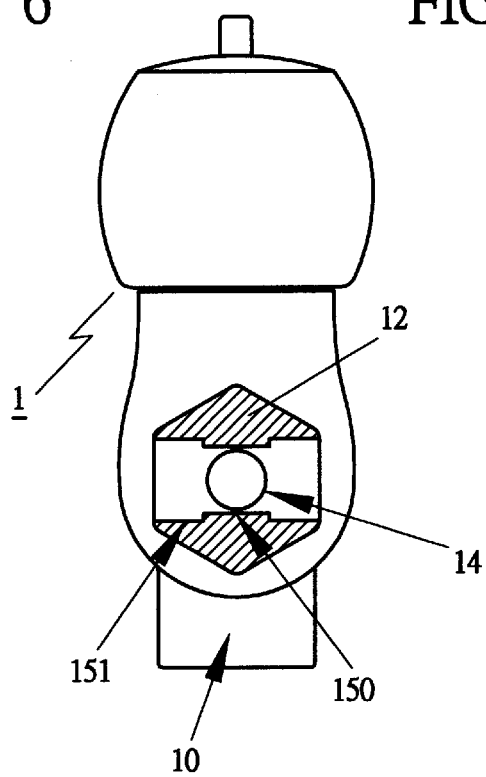
FIG. 8 is a cross-sectional view of the faucet not yet installed with an adjust valve in the present invention.

The adjust valve 2 consists of valve body 20 and a valve cap 21 both provided with an annular groove 200, 210 for an O-shaped ring 22, 23 to fit therein. Further the valve body 20 and the valve cap 21 respectively have a tool hole or slot 201, 211 for a tool to rotate the adjust valve 2 to alter the volume of water to flow out. The valve body 20 also has a small neck portion 202 with a vertical hole 203 having a smaller diameter than that of the water passageway 14, as shown in FIGS. 6, 7, 10 and 11. The valve body 20 further has male threads 204 and the valve cap female threads 214 to screw with each other, as shown in FIGS. 6, 7, and 8.

Figure 5:
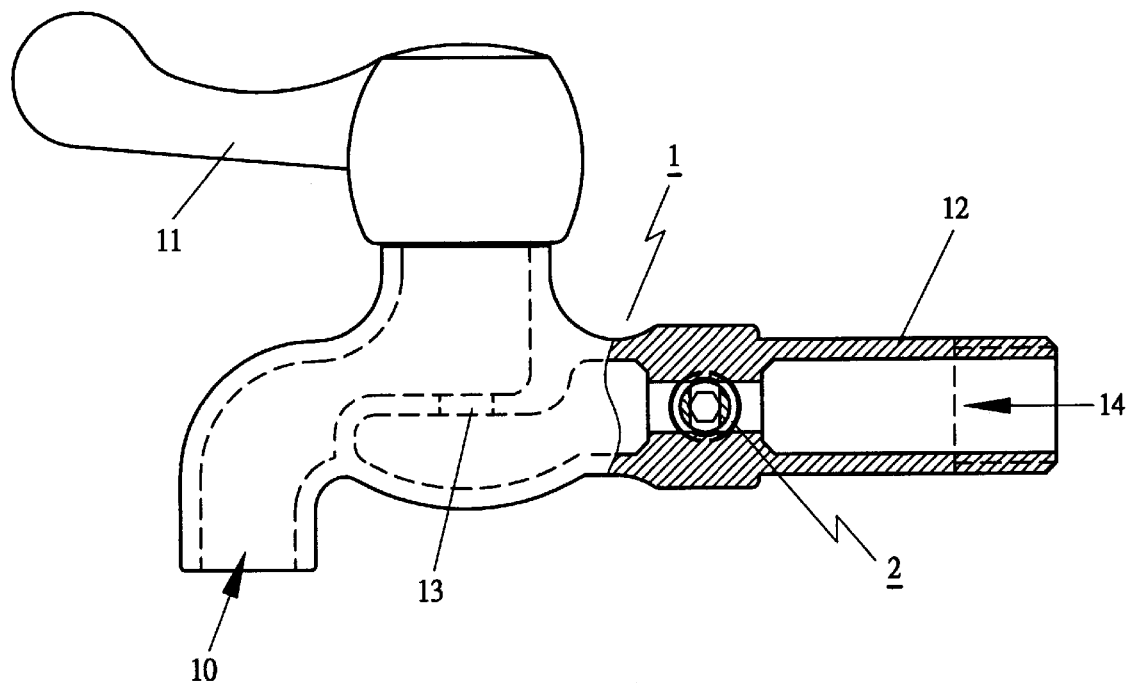
FIG. 5 is a partial cross-sectional view of the first embodiment of a volume adjustable faucet in the present invention.

Then the valve body 20 is inserted in a first side of the through hole 15 and the valve cap is inserted in a second side of the through hole 15 to screw with each other, as shown in FIGS. 3 and 6. The valve body 20 and the valve cap 21 are secured stabilized by means of the comparative large outer annular portion 205 and 215 of the valve body 20 and the valve cap 21 having a larger diameter than that of the inner annular wall 150 of the through hole 15 so that the valve body 20 and the valve cap 21 may not be pushed out of the through hole 15, no matter how large the water pressure may be. The O-shaped rings 22, 23 closely contact the inner wall of the through hole 15 to prevent water leak. In case that the through hole 203 is adjusted to align to the passageway 14 as shown in FIGS. 5 and 9, water flowing out is the largest, but if adjusted to form ±90 degrees to the passageway 14, water flowing out is the least, as shown in FIGS. 6 and 10, able to freely adjust the water volume to flow out.

Figure 9:
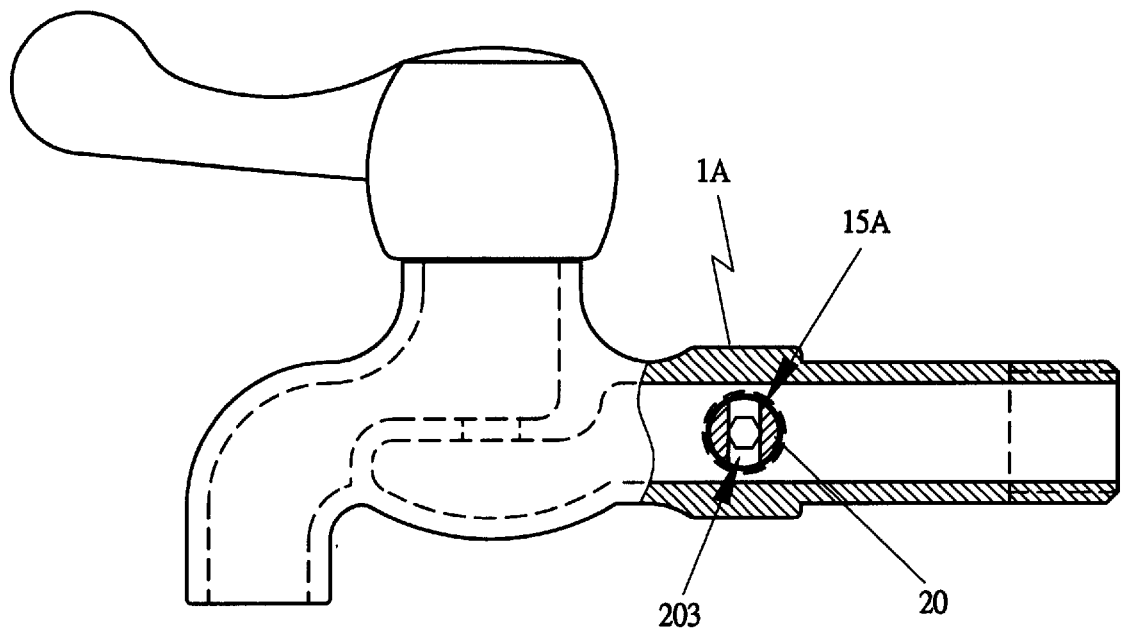
FIG. 9 is a side cross-sectional view of a second embodiment of a volume adjustable faucet in the present invention.
Figures 10, 11:
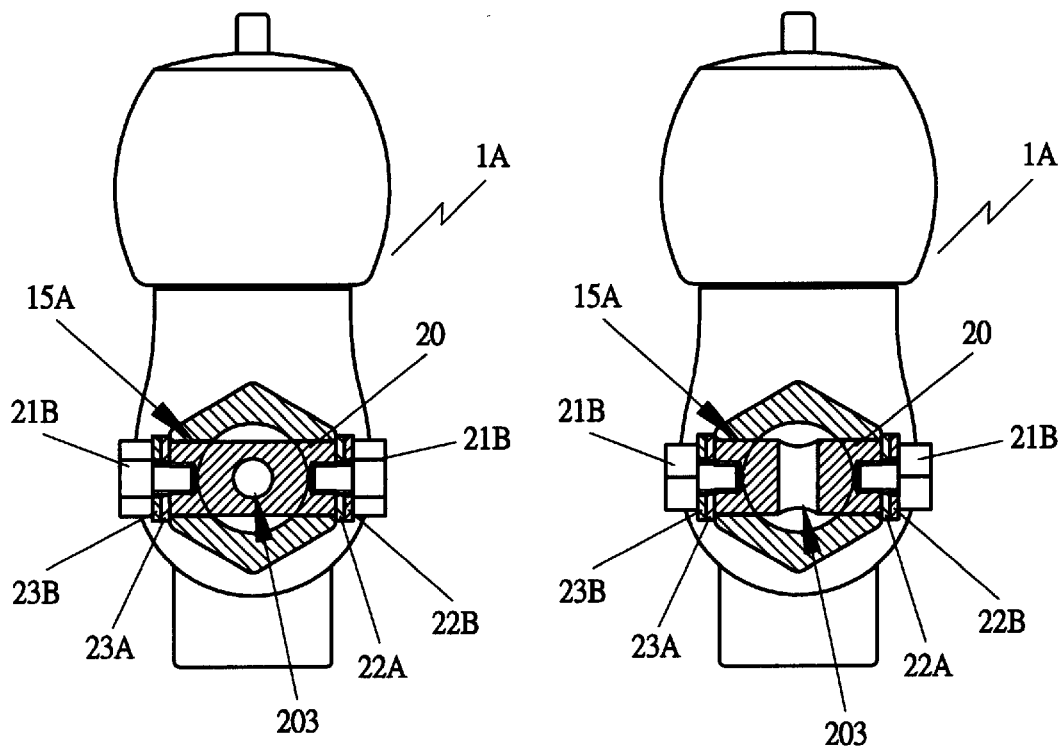
FIG. 10 is a cross-sectional view of the second embodiment of a volume adjustable faucet with the largest volume flowing out in the present invention.
FIG. 11 is a cross-sectional view of the second embodiment of a volume adjustable faucet with the least volume flowing out in the present invention.

A second embodiment of the invention is shown in FIGS. 9, 10 and 11, has the same structure and added with a through hole 15A for the valve body 20 to extend in and having two valve caps 21A and 21B at two sides of the valve body 20 to screw with, and two O-shaped rings 22A and 23A tightly fitted between to hamper leak.

Figure 12:
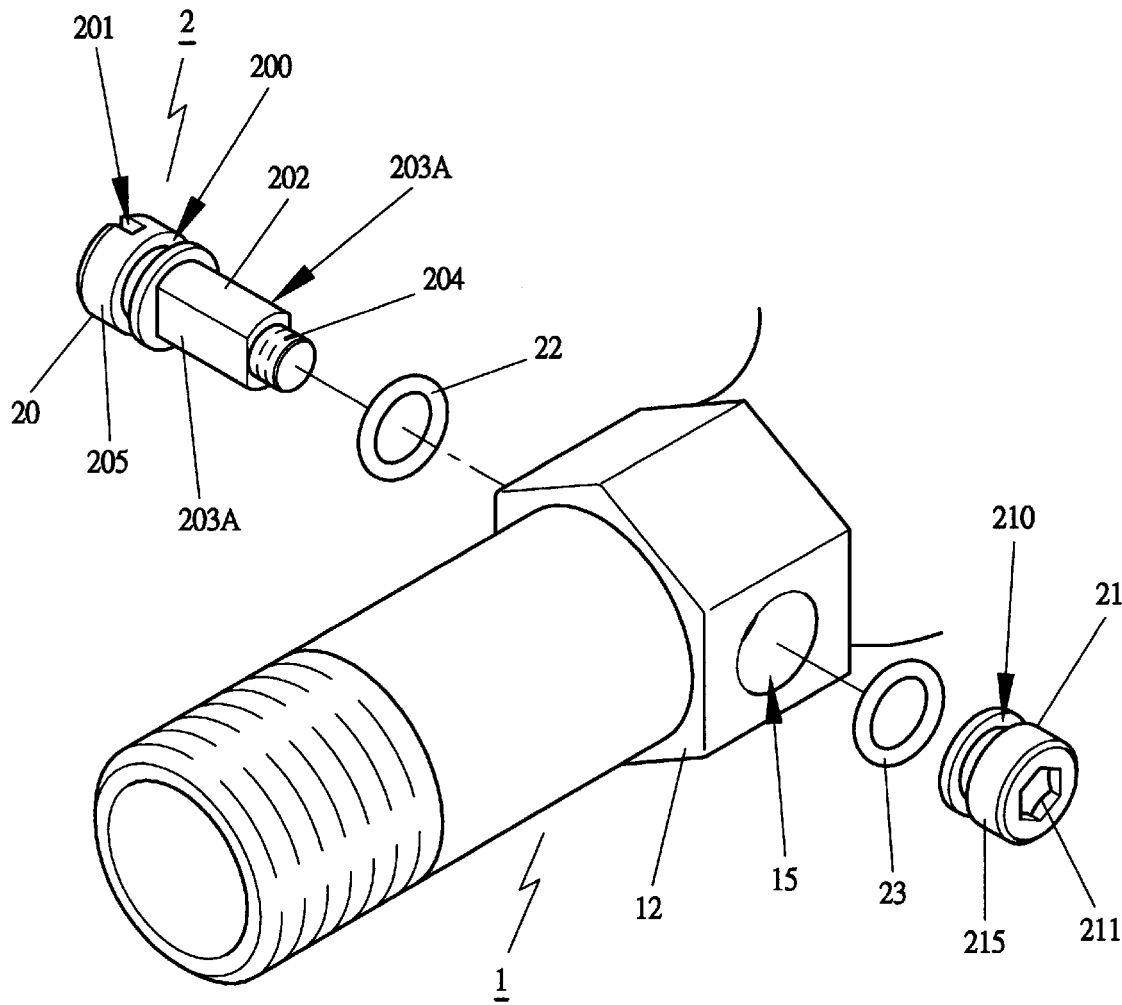
FIG. 12 is an exploded perspective view of a third embodiment of a volume adjustable faucet in the present invention.
Figures 13, 14:
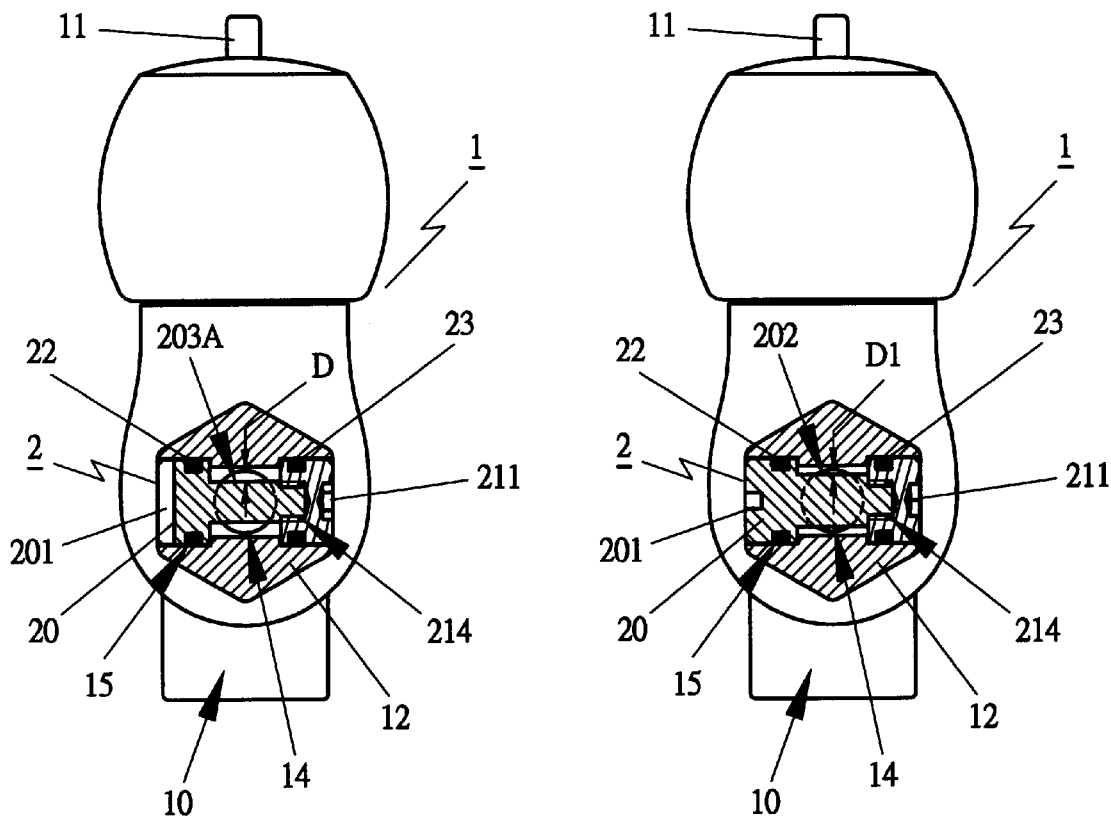
FIG. 13 is a cross-sectional view of the third embodiment of a volume adjustable faucet with the largest volume flowing out in the present invention; and, FIG. 14 is cross-sectional view of the third embodiment of a volume adjustable faucet with the least volume flowing out in the present invention.

Next, a third embodiment of the invention is shown in FIGS. 12, 13 and 14, also has almost the same structure, but the different point is the valve body 20 has the small neck portion not provided with the vertical hole 203, but with a flat vertical side 203A to form a gap D to the passageway 14 as shown in FIG. 13 to produce comparatively large water flowing out, but if the gap D is altered to D1 as shown in FIG. 14, it allows only a small volume of water flowing out.

While the preferred embodiments of the invention have been described above, it will be recognized and understood that various modifications may be made therein and the appended claims are intended to cover all such modifications that may fall within the spirit and scope of the invention.

What is claimed is:

1. A volume adjustable faucet comprising a body with an outlet, a switch and a rod portion, and an adjust valve, said rod portion having a through hole, said adjust valve consisting of a valve body and a valve cap, said valve body and said valve cap both having an annular groove for an O-shaped ring to fit therein to hamper water leak, said valve body having a small neck portion provided with a vertical hole, said valve body inserting in said through hole from a first side, said valve cap inserting in said through hole from a second side to screw with said valve body, the volume of water flowing out of said outlet being alterable by adjusting the angle between said vertical hole and a passageway in said rod portion so as to save water by freely adjusting the volume of water to flow out.

2. The volume adjusting faucet as claimed in claim 1, wherein said through hole is provided vertical to said passageway.

3. The volume adjusting faucet as claimed in claim 1, wherein said small neck portion of said valve body has a smaller diameter than that of said passageway.

4. The volume adjusting faucet as claimed in claim 1, wherein said valve body has male/female threads and said valve cap has female/male threads.

5. The volume adjusting faucet as claimed in claim 1, wherein said valve body and said valve cap both have a comparative large annular portion having a larger diameter than an inner annular wall of said through hole and a smaller diameter than an outer diameter of said through hole so that said valve body and said valve cap may be secured stabilized after they are screwed with each other and are in a hidden condition.

6. The volume adjusting faucet as claimed in claim 1, wherein said body is provided with a through hole for a valve body to extend therein, said valve body has a hole and two sides screwed respectively with a valve cap, and said valve caps tightly push a washer and then an O-shaped ring to hamper water leak.

7. The volume adjusting faucet as claimed in claim 1, wherein said adjust valve has a flat vertical side formed on said small neck portion so that a gap D between said small neck portion and said passageway may be altered to adjust the volume of water flowing out.

* * * * *